United States Patent Office 3,514,779
Patented May 26, 1970

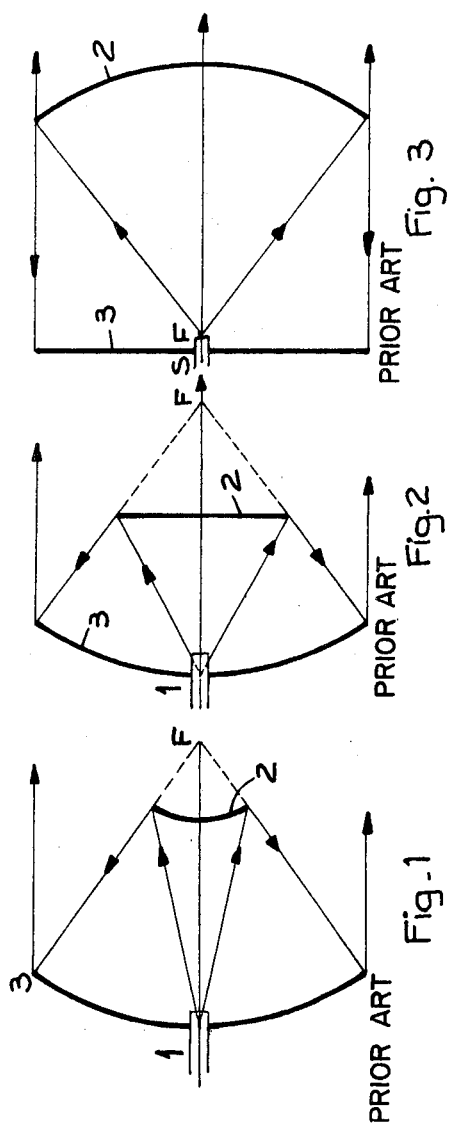
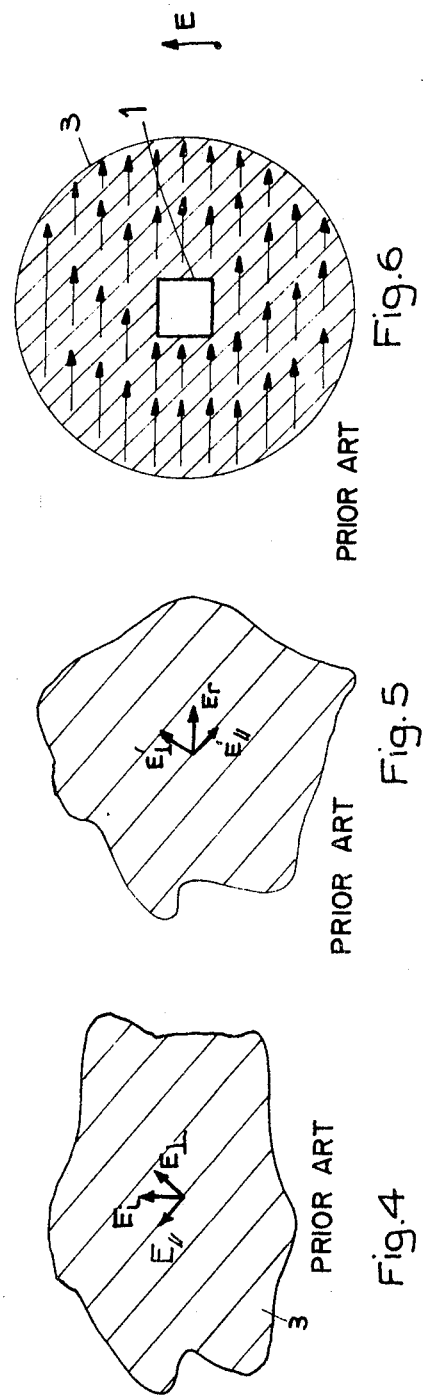

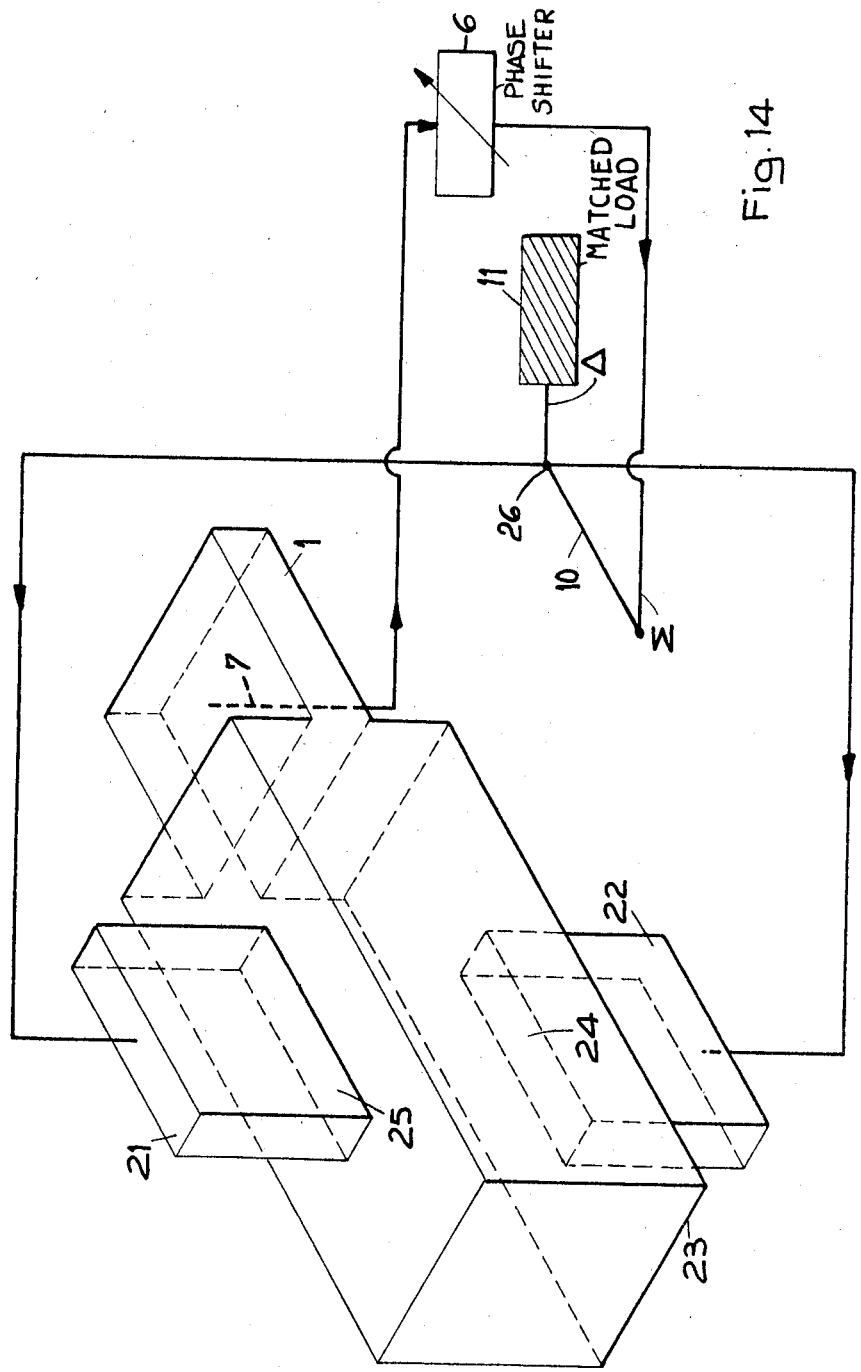

3,514,779
ANTENNAE WITH FOCUSING DEVICES
Yves Commault, Paris, France, assignor to CSF-Compagnie Generale de Telegraphie Sans Fil, a corporation of France
Filed Feb. 13, 1967, Ser. No. 615,744
Claims priority, application France, Feb. 25, 1966, 51,133
Int. Cl. H01q *19/00, 19/12, 19/14*
U.S. Cl. 343—756           7 Claims

ABSTRACT OF THE DISCLOSURE

In a radiation system comprising a primary source, radiating a wave with a predetermined polarization, a semi-transparent reflector and a polarization changing reflector, an auxiliary radiation is provided in order to cancel the effect on the radiation of the system, of the shadow of the source; the auxiliary radiation has the same polarization as the wave by the systems.

---

The present invention relates to antennae comprising a primary source and a focusing device.

Such antennae make it possible to obtain plane wave surfaces and high gains.

These antennae generally comprise a parabolic reflector, illuminated by a horn located in its focus. This horn masks a part of the paraboloid surface. This results in a shadow effect on the transmitted wave. The gain of the antenna is therefore reduced and the level of the secondary lobes increased.

It is an object of the invention to avoid this drawback.

According to the invention, there is provided a system for radiating an electromagnetic wave with first predetermined polarization, said system comprising: a semi-transparent reflector, transparent to the waves with said predetermined polarization and fully reflecting the waves with a second predetermined polarization, a polarization changing reflector changing the polarization of the waves reflected by it from said second to said first polarization, and radiating means directing towards said semitransparent reflector a primary wave with elliptic polarization.

For a better understanding of the invention, reference will be made to drawings accompanying the following description and in which:

FIGS. 1, 2 and 3 represent diagrammatically known antennae;
FIGS. 4, 5 and 6 are drawings explaining the invention;
FIGS. 7 and 8 are diagrams explaining the invention;
FIGS. 9 and 10 are partial and plan views, respectively, of a non-limitative example of an embodiment of the device according to the invention; and
FIG. 11 and the following figures are embodiments of coupling systems used in the invention.

In FIG. 1, there is shown diagrammatically a Cassegrain type antenna. The same comprises a source 1 illuminating a hyperbolic mirror 2. The virtual image of the source 1, relative to the mirror 2, is at F, the focus of a parabolic mirror 3.

It follows, that the rays emitted by the source 1 are, after successive reflections from the mirrors 2 and 3, parallel to the axis of the mirror 3.

Two modifications of this arrangement are shown in FIGS. 2 and 3, where the same reference numerals designate the same parts.

In FIG. 2, the mirror 2 is a plan mirror. The trajectories of the rays are similar to those of FIG. 1.

In FIG. 3, the source 1 is at the focus F of the parabolic mirror 2. The rays are then reflected by the mirror 2 towards a plane mirror 3 which is normal thereto. They are therefore reflected by this latter mirror in the same direction with the opposite sense. Means are provided to the effect that they pass through the parabolic mirror without reflection.

Where linearly polarized waves are to be radiated by the system, mirror 2 consists, for example, of a panel of wires, normal to the desired direction of polarization. The source 1 directs toward the mirror 2 a primary wave which is linearly polarized, the electric field vector of the latter being parallel to the wires. Mirror 3 comprises, for example, a panel of wires inclined a $\pi/4$ with respect to the electric field vector $\vec{E_i}$ shown in FIG. 4 associated with an entirely metallic reflector. It follows therefrom that, after double reflection and passage through the second mirror, the wave has a field vector $\vec{E_r}$ shown in FIG. 5 perpendicular to the field vector $\vec{E_i}$. Indeed the wave of electric field $E_i$ may be considered as the resultant of two component plane waves respectively polarized parallel and normally to the wires of reflector 3. Vectors $E_\parallel$ and $E_\perp$, FIG. 4 represent respectively the electric field of said components. Upon striking the panel of wires of reflector 3, the plane wave parallel to the waves is reflected by the latter with phase inversion, as indicated by vector $E'_\parallel$, FIG. 5 while the wave normal to the wires propagates through the panel and is reflected by the metallic reflector with a phase inversion. Due to the fact that the distance between the panel of wires and the entirely metallic plane is $\lambda/4$, the electric field vector, $E'_\perp$ at the wires, of the wave reflected by the metallic plane is again parallel to $E_\perp$. The two reflected component waves combine to form a wave whose electric field is the resultant of vectors $E'_\parallel$ and $E'_\perp$, i.e. along vector $E_r$ in FIG. 5.

Where circularly polarized waves are to be radiated by the system, mirror 2 consists, for example, of a panel of levogyrous or dextrogyrous reflector elements, according to whether the polarization of said waves to be radiated is dextrogyrous or levogyrous, i.e. to whether the electric field vector rotates in the reverse or in the direct trigonometric direction.

The source 1 directs towards the mirror 2 a primary wave which is levogyrous or dextrogyrous according to whether the wave radiated by the system is dextrogyrous or levogyrous. Thus, the primary wave is fully reflected towards mirror 3 which may merely consist of a metallic reflector, since such a reflector has the property of reversing the rotation direction of the electric field vector of a circularly polarized wave.

It follows from all this that the mirror 3, which is the output pupil of the assembly, has an aperture which determines the gain and the radiation diagram of the assembly. The source 1 masks, as shown in FIG. 6, a part of the mirror 3. And it is known that any shadow falling on the radiating surface causes a degradation both of the gain and of the diagram.

It may be shown that the radiation diagram results from the superimposition of two separate radiations:

(a) That of the radiating surface such as it would be without any incident shadow, radiating a wave with rectilinear polarization and with a predetermined phase;

(b) That of the surface, the outline of which is that of the shadow, radiating a wave with the same polarization as the preceding one, but in phase opposition thereto.

FIG. 7 shows the diagram $E=f(\theta)$ of such an antenna. The curve $C_1$ represents the radiation diagram of the surface without incident shadow. The curve $C_2$ represents the diagram of the surface having the outline of the incident shadow. The curve $C_3$ represents the resultant diagram.

It may be seen on this drawing that the curve $C_3$ is always below the curve $C_1$. Moreover, the secondary lobes represented by the extremes of the curve $C_3$ are more accentuated than those of the curve $C_1$.

The invention eliminates the effects of the incident shadow. According to the invention the radiation source itself is used for creating a field with an amplitude identical to that resulting from the curve $C_2$, but in phase opposition thereto. One obtains thus the curve $C_4$ shown in FIG. 8.

An arrangement according to the invention, which is applicable to the antenna of FIG. 3, is shown in FIGS. 9 and 10.

FIG. 10 shows the source 1, located in the focus of the parabolic mirror 2 and in the centre of the plane mirror of the arrangement shown in FIG. 3. This source, shown in section in FIG. 9 is a simple guide in which a wave $TE_{10}$ is excited, giving rise to the incident field $E_i$. The radiated field is the field $E_R$ with a polarization direction perpendicular to the polarization direction of the field $E_i$ as explained above.

The invention consists therefore in exciting a wave $TE_{01}$, in the guide 1, in addition to the wave $TE_{10}$: the resulting wave is a wave with elliptic polarization. The wave $TE_{01}$ propagates through the parabolic mirror 2 without alteration and is radiated directly, with a polarization parallel to $E_R$. It may therefore be seen that, by imparting to the $TE_{01}$ wave suitable amplitude and phase with respect to those of the $TE_{10}$ wave, the compensation effect is obtained, as proposed by the invention (see FIG. 8).

Let it be assumed that $l$ is the mean distance between the mirrors 2 and 3 and the wave $TE_{10}$ covers between these two mirrors a path substantially equal to $3l$, prior to being transmitted. The wave $TE_{01}$ covers a path equal to $l$. For the two waves to be in phase at the output from the mirror 2, it is necessary that at the output of the source 1 they should have a relative phase shift of $\Delta \varphi$ which may be calculated.

The arrangement according to the invention comprises, for example, a coupler 5, picking up a part of the wave $TE_{10}$, a phase-shifter 6 and a junction re-injecting the energy with the suitable phase in the source in the mode $TE_{01}$.

More generally, disregarding whether a linearly polarized or a circularly polarized wave is to be radiated, the mouth of guide 1 radiates an elliptically polarized wave, which can also be considered as resulting from two waves with circular polarization rotating in opposite directions.

Where a circularly polarized wave is to be obtained, the source radiates a main primary wave with a circular polarization opposite to the desired one, which main radiation, after reflection on reflectors 2 and 3, forms the main part of the desired radiation, and a correcting radiation with a circular polarization identical with that of the desired radiation, which passes directly through reflector 2 and "fills" the hole due to the shadow of the source on the main radiation.

FIG. 11 shows in cross-section, and FIG. 11a in plan view, a first embodiment.

The source comprises a rectangular guide G fed by means of a guide H in which a wave which has only the mode $TE_{10}$ propagates. The respective walls of the two guides G and H form an angle $\theta$. It follows that the two modes $TE_{10}$ and $TE_{01}$ are excited simultaneously in the guide G. The phase difference, at the output of the source, of these two modes $TE_{10}$ and $TE_{01}$ is a function of the difference in the speeds of propagation and of the length of the operating frequency. The present arrangement does not function in a wide band.

Figure 12:
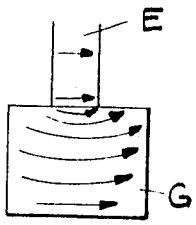
Figure 12A:
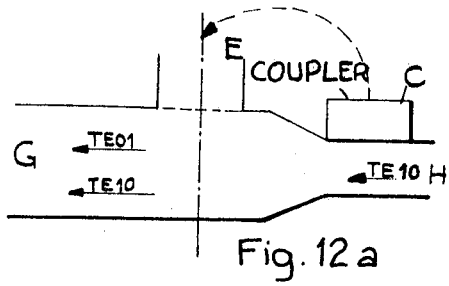

FIGS. 12 and 12a show a second embodiment in plan view and in cross-section, respectively. This arrangement comprises a radiating guide G. This guide is connected to a guide H in which travels only the wave $TE_{10}$. A coupler C picks up a part of the energy in the guide H and re-injects the same at E into the guide G in the mode $TE_{01}$. The coupler C and the guide G are connected by a guide of suitable length.

Figure 13:
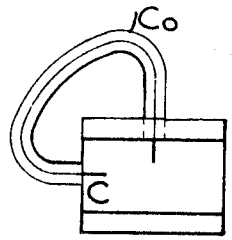
Figure 13A:
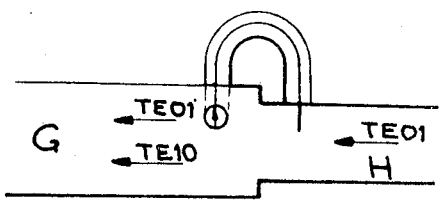

FIGS. 13 and 13a show an ambodiment in plan view and in cross-section. The coupler C is connected to a coaxial cable which is so connected to the guide that it excites therein a wave $TE_{10}$. To this end it is sufficient to arrange the coupling probe in the small wall of the guide.

Figure 7:
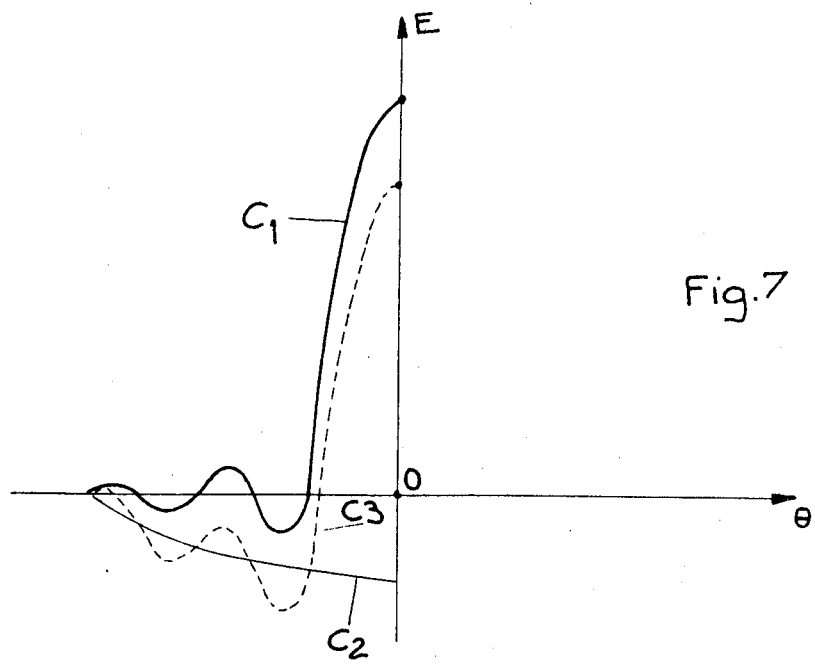
Figure 8:
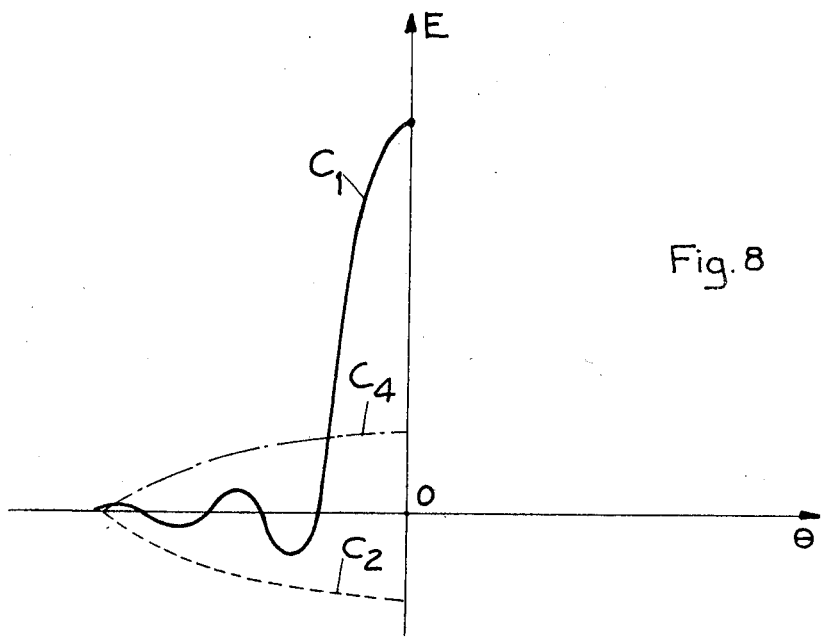
Figure 9:
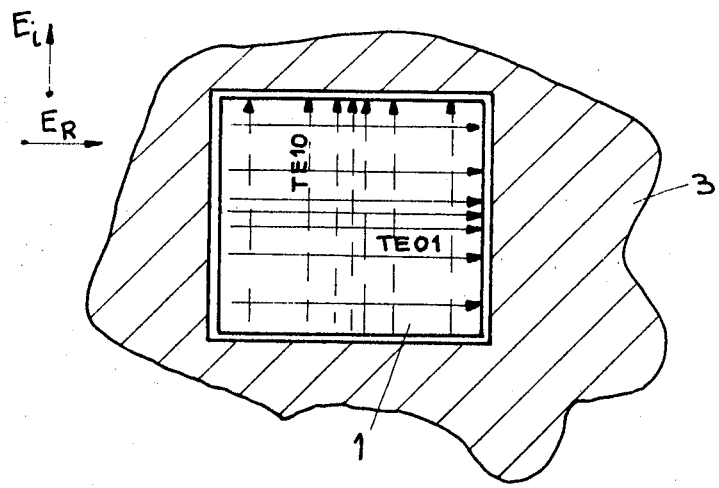
Figure 10:
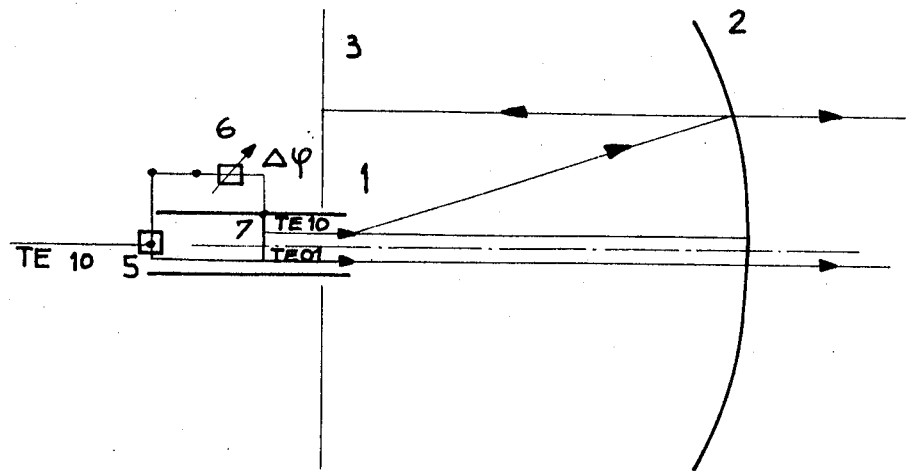
Figure 11:
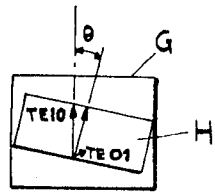
FIGS. 11 to 14 represent embodiments of sources used according to the invention.
Figure 11A:
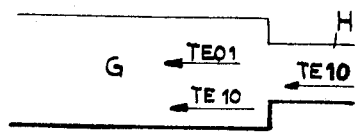

With the described arrangements, the phase difference of the waves $TE_{10}$ and $TE_{01}$ is controlled by the choice of the distance between the couplings C and E. The bandwidth is much larger than in the arrangement of FIG. 11.

Figure 14A:
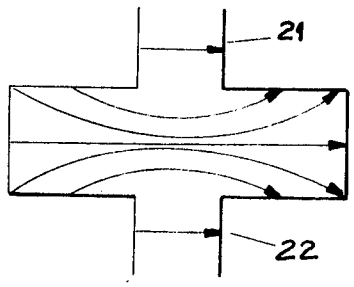

Another embodiment is shown in perspective in FIG. 14 and in cross-section in FIG. 14a.

The guide 1 is excited to generate the wave $TE_{10}$; a probe 7 picks up a part of the energy, which, through a phase-shifter 6, is coupled to the sum branch $\Sigma$ of a magic T 26, shown diagrammatically, and the difference arm $\Delta$ of which is closed on an adapted load 11. The two output arms of the T are connected to two guides 21 and 22 by leads with equal electrical length. The two guides 21 and 22 by leads with equal electrical length. The two guides 21 and 22 are excited according to the $TE_{10}$ mode. They are coupled symmetrically to a guide 23 which is connected to the guide 1. To this end they are coupled to the guide 23 through two slots formed into the large walls.

FIG. 14a shows the guides 21 and 22; since they are excited in phase, a wave $TE_{01}$ is generated in the guide 23 and its phase relation with the wave $TE_{01}$, excited in the same guide 23 by the guide 1, is determined by the control of the phase-shifter 6. Such a system is particularly advantageous in the case of "monopulses."

Of course, the invention is not limited to the embodiments described and shown which were given solely by way of example, other arrangements being possible without thereby departing from the principle of the invention.

What is claimed is:

1. A system for radiating an electromagnetic wave with a first predetermined polarization, said system comprising: a semi-transparent reflector, fully transparent to the waves with said first predetermined polarization and fully reflecting the waves with a second predetermined polarization, a polarization changing reflector changing the polarization of the waves reflected by it from said second polarization to said first polarization, and radiating means, directing towards said semitransparent reflector a primary wave with said second polarization and a correcting wave with said first polarization, said primary wave being reflected by said first reflector towards said second reflector and reflected again by said second reflector as a wave with said first polarization, said means being on the paths of the waves reflected by said reflectors, said correcting wave being radiated directly through said first reflector and compensating the shadow of said means.

2. A system as claimed in claim 1, wherein said first predetermined polarization is a linear polarization and said polarization changing reflector is a 90° polarization rotating reflector.

3. A system as claimed in claim 1, wherein said radiating means comprise a waveguide and means for propagating therein wave energy in $TE_{10}$ mode and in $TE_{01}$ mode.

4. A system as claimed in claim 3, wherein said radiating means comprise two communicating wave guides, one of which is capable of propagating waves in the $TE_{01}$ and $TE_{10}$ modes and the other is capable of propagating waves in only one of said modes.

5. A system as claimed in claim 4, wherein said guides are in prolongation of each other, their respective planes of symmetry being at an angle with respect to each other.

6. A system as claimed in claim 4 comprising coupling means for picking up a part of the energy from said one mode propagating guide and for feeding said part of energy into said two modes propagating guide.

7. A system as claimed in claim 6, wherein said coupling means comprise a probe, variable phase-shifting means coupled to said probe, two identical guides coupled to opposite walls of said two modes guide, and means for equaly coupling said phase-shifting means to said identical guides.

References Cited

UNITED STATES PATENTS

| | | |
|---|---|---|
| 2,736,895 | 2/1956 | Cochrane. |
| 3,025,513 | 3/1962 | Easy et al. |
| 3,195,137 | 7/1965 | Jakes _____ 343—756 |
| 3,238,529 | 3/1966 | Bock _____ 343—756 X |
| 3,284,725 | 11/1966 | Bowman _____ 343—756 X |
| 3,314,027 | 4/1967 | Jones et al. _____ 333—21 |
| 3,340,535 | 9/1967 | Damonte et al. _____ 343—756 |

HERMAN KARL SAALBACH, Primary Examiner

T. J. VEZEAU, Assistant Examiner

U.S. Cl. X.R.

343—781, 840